(12) United States Patent
Nordentoft et al.

(10) Patent No.: US 7,681,232 B2
(45) Date of Patent: Mar. 16, 2010

(54) CREDIT CARD AND A SECURED DATA ACTIVATION SYSTEM

(75) Inventors: Torsten Nordentoft, Paris (FR);
Susanne H Lastein, Holsted (FR);
Bjørn Skern, Paris (FR); Per Birger Andersen, Paris (FR)

(73) Assignee: Cardlab ApS, Copenhagen S (DK)

( * ) Notice: Subject to any disclaimer, the term of this patent is extended or adjusted under 35 U.S.C. 154(b) by 1503 days.

(21) Appl. No.: 11/001,641

(22) Filed: Dec. 2, 2004

(65) Prior Publication Data
US 2005/0194452 A1 Sep. 8, 2005

(51) Int. Cl.
*G06F 9/00* (2006.01)
(52) U.S. Cl. .............................. 726/9; 726/20; 713/186; 235/380; 235/381; 235/492; 382/124
(58) Field of Classification Search ......... 713/185–186; 726/9, 20; 705/41; 307/10.5; 360/2; 340/568.7, 340/5.6; 235/382, 379, 380, 492; 382/124
See application file for complete search history.

(56) References Cited

U.S. PATENT DOCUMENTS

| | | | |
|---|---|---|---|
| 4,158,433 A | | 6/1979 | Peterson et al. |
| 4,825,056 A | * | 4/1989 | Ohta et al. ................... 235/449 |
| 4,829,166 A | * | 5/1989 | Froelich ..................... 235/379 |
| 5,627,355 A | | 5/1997 | Rahman et al. |
| 6,325,285 B1 | | 12/2001 | Baratelli |
| H002120 H | * | 7/2005 | Cudlitz ....................... 235/382 |
| 7,278,025 B2 | * | 10/2007 | Saito et al. .................. 713/185 |
| 2002/0032657 A1 | | 3/2002 | Singh |
| 2003/0106935 A1 | | 6/2003 | Burchette, Jr. |
| 2004/0133787 A1 | | 7/2004 | Doughty et al. |

FOREIGN PATENT DOCUMENTS

| | | |
|---|---|---|
| CA | 2 317 642 A1 | 3/2001 |
| DE | 196 18 144 C1 | 4/1997 |
| DE | 196 48 767 A1 | 6/1997 |
| EP | 0 994 439 A2 | 4/2000 |

(Continued)

*Primary Examiner*—Thanhnga B Truong
(74) *Attorney, Agent, or Firm*—Jacobson Holman PLLC (57) ABSTRACT

The present invention relates to a credit card comprising a card body, which comprises fingerprint reading means providing fingerprint signals representative of at least one fingerprint from a card user, when at least one finger of said user is pressed against said fingerprint reading means. Said card body further comprises data carrier means holding at least card owner fingerprint data and secured data, and fingerprint authentication means for activating said secured data. The card body further comprises an electrical power supply delivering electrical current to at least said fingerprint reading means. Accordingly, there is no need for an external electrical power supply, and thus the existing standard card reading systems, such as ID-card readers, money transfer machines such as ATM's and the like may be used in conjunction with said credit card. Thus, investments into new standard reader systems are not necessary in order to improve the security of the secured data carried by the credit card. A complete and self-contained automated authentication process is conducted prior to communication concerning said secured data being established between said credit card and any of the existing ATM's on the market today, irrespective of type (automated or manually operated), manufacturer, version, or geographical position of said ATM and of credit card use.

22 Claims, 4 Drawing Sheets

FOREIGN PATENT DOCUMENTS

| | | |
|---|---|---|
| EP | 1 231 562 A1 | 8/2002 |
| EP | 1 326 196 A1 | 7/2003 |
| GB | 2 243 235 A | 10/1991 |
| WO | WO 00/49561 | 8/2000 |
| WO | WO 01/31577 A1 | 3/2001 |
| WO | WO 01/52204 A1 | 7/2001 |

* cited by examiner

Fig. 6

CREDIT CARD AND A SECURED DATA ACTIVATION SYSTEM

The present invention relates to a credit card comprising a card body, which comprises fingerprint reading means providing fingerprint signals representative of at least one fingerprint from a card user, when at least one finger of said user is pressed against said fingerprint reading means, data carrier means holding at least card owner fingerprint data and secured data; a readout area; fingerprint authentication means comprising a data processor, which is able to authenticate said fingerprint signals with said card owner Fingerprint data; and an electrical power supply delivering electrical power to at least said fingerprint reading means, said fingerprint authentication means, and said readout area.

A credit card of such type is disclosed in international patent application WO 01/52204.

Further, the present invention relates to a secured data activation system for a data carrier, such as a credit card according to the invention.

Credit cards in the terms of the present invention comprise any card provided with data carrier means carrying data to be secured intended for card owner use only. Credit cards of such type include smart cards, where said secured data is stored on a chip, and magnetic strip cards, where the secured data is stored in a magnetic strip. Such credit cards are presently used for different applications, such as ID-cards or drivers licenses for identification purposes, and credit or money transfer cards for carrying data for use in money transfers in e.g. automated teller machines (ATM's) like cash teller machines or automated payment systems, either stationary or portable, or reading devices for Internet commerce and the like.

These credit cards, generally called plastic cards, have gained large popularity in the last decades as a medium by which purchase money is paid and business transacted without the necessity of carrying cash or enduring a long term escrow or other means for transferring title or securing payment of cash. With the popularity and ready acceptance of credit cards in the business world, the use thereof by unscrupulous persons to make unauthorized transaction has become a serious problem costing the consumers millions of dollars annually. As the demand for such credit cards has risen amongst card thieves, counterfeiters and other illegal uses, the demand for improperly obtained cards market has skyrocketed thus creating an extremely high incentive for these individuals to succumb to temptation.

Since ID-cards may carry sensitive data concerning an individual credit card owner, these cards have also developed into carrying data to be secured from individuals having intent to misuse said data.

Such credit cards with sensitive data requiring personal identification are relatively easy to copy or misuse, especially magnetic strip credit cards have proven easy to copy. There have been many efforts in the past to deal with the problem of further securing said credit cards, including coding thereof for check at the point of purchase to determine if the credit card may be a stolen or copied credit card.

One way of securing said data has concentrated on assigning credit cards with individual multi-digit ID code numbers, e.g. Personal Identification Numbers or. PIN's, which the credit card user must keep secret and use at ID-code number checking ATM's. A credit card user carrying several credit cards from different credit card providers will in such cases have to remember and learn by heart several ID-code numbers, which is often difficult, especially if the user is carrying many such credit cards. As a consequence and contrary to credit card provider advice, some users note their ID-code numbers in the vicinity of their credit cards, often being carried in pockets or in the wallet carrying the credit cards.

If a credit card thief has gained access to both a credit card and the corresponding ID-code number, e.g. by stealing a wallet containing such effects, these provide easy access to cash in ATM's or commodities in ware houses and shops, often even before the owner of the credit card have time to cancel his or hers credit cards, or they may provide the thief access to personal information and services not intended for him/her.

In another effort, EP 1 326 196 A1 discloses a smart card for use in conjunction with a security portal, such as a transit portal or parking facility for performing authentication check for authorized passage. Fingerprint pattern sensors on the card generate print pattern signals, which are checked against authentic versions stored in a memory in the card, using a processor located on the card, and the result of this is communicated with the associated external security portal.

U.S. Pat. No. 6,325,285 discloses a smart card with an integrated fingerprint reader, a CPU, and a memory in order to perform verification of the card user and based on this verification to grant access to secured data on said card.

A drawback is such credit cards requires an external system, an ATM or the like, which is specially adapted to communicate with such a credit card in order to activate it in the ATM. Moreover, such biometric credit cards with secured data stored on a magnetic strip are not suitable for automatic payment systems requiring fast transfer of the credit card through a card reader, e.g. portable devices, because there is not enough time for an authentication of the credit card during communication with the card reader.

It is therefore one object of the present invention to provide a fingerprint authenticating credit card, which improves the security of the secured data being carried by the said card by performing an of any external system independent fingerprint authentication and which credit card does not require any changes in the existing card reading devices, such as ATM's and the like, and as such may be used directly with these.

In international patent application WO 01/52204 is described a credit card comprising a communication unit for communicating with an external unit and being activatable by a fingerprint reader and a processor. In one embodiment, the processor can be instructed to generate the appropriate magnetic signal information to a magnetic strip, so that the card can be read after activation, but no information is disclosed concerning how to generate such appropriate magnetic signal information to the magnetic strip, which renders it difficult to provide a homogenous magnetic field for an effective communication of secured data to a credit card reader.

Accordingly, it is therefore another object of the present invention to provide a credit card which improves the security of said secured data by improving the data communication between said credit card and a credit card reader.

These objects are achieved in a first aspect of the invention by a credit card of the initially mentioned kind, wherein said readout area comprises at least one driver circuit in communication with at least one transducer coil, which comprises one or more windings around at least one strip of electromagnetically inducible core material, each strip being individually inducible by said processor to emit secured data signals corresponding to said secured data.

Accordingly, a time controllable, reliable and thus effective data communication is achieved by electromagnetic emission of secured data signals by said credit card, where the processor causes the emission of said secured data signals from said at least one transducer coil. Thus, the secured data is only available for a credit card reader after authentication by said fingerprint authentication means and during emission of said secured data signals, resulting in a substantial improvement of the security of said secured data. By providing a credit card according to the invention, the manufacture is eased and the credit card is mass-producible in large numbers. Further, the physical and even more importantly the electromagnetical appearance of the transducer coil is substantially like that of a conventional magnetic strip, resulting in said credit card can be utilized with presently available credit card readers for magnetic strip reading. A suitable selection of core material for the core strips strongly influences the strength and homogenous distribution of the magnetic field being produced. This provides for an enhancement of said magnetic field, resulting in a lower electrical power consumption of said credit card, when creating said magnetic field, which prolongs the life time of said credit card. Further, there is no need for an external electrical power supply, and thus the existing standard systems, such as ID-card readers and money transfer readers, may be used in conjunction with said credit card, i.e. investments in new standard reader systems are not necessary in order to improve the security of the data carried by the credit card. A major advantage of said credit card according to the present invention is accordingly the fact that a complete and self-contained automated authentication process is performed prior to communication concerning said secured data being established between said credit card and any of the existing ATM's on the market today, irrespective of type (automated or manually operated), manufacturer, version, or geographical position of said ATM, and of credit card use.

In one embodiment of said credit card, fingerprint authentication means control activation of said secured data based on authentication of the fingerprint signals by comparing these with said card owner fingerprint data, if the comparison is a match, then said secured data is activated; else said secured data is not activated One advantage provided by this embodiment includes a realisation of such a credit card according to the present invention may be secured without the need for an ID-code number used in conjunction with ATM's and the like. The authentication is performed on the card, independently from any external device and may provide further security to said credit card according to the present invention. Of course, combining an authentication on-the-card and an ID-code number check may further increase the security around the secured data.

In another embodiment of said credit card, said activation of said secured data is maintained over a predetermined time period. One advantage provided by this embodiment includes that the owner of the credit card is not required to press his/her fingers against the fingerprint reader during the time period, where secured data is being communicated between the credit card and the read device of an external system. This enables the card to be inserted into e.g. an ATM, which operation requires the credit card user to let go of the credit card during said communication time period. Thus, the communication between reader means and credit card is improved and the security of the secured data is increased.

In a further embodiment of said credit card, the activation of secured data is performed one or several consecutive times by said at least one transducer coil. Thus, secured data is available for communication to any read unit only during said predetermined time period, either as one magnetic field signal being generated during the extend of said predetermined time period or for a shorter time period, or as several consecutive signals spanning the entire predetermined time period or segments of it. This further increases the security of the secured data upon said credit card, and enables the communication with several types of credit card readers available, such as swipe or insert-type credit card readers.

In another embodiment of said credit card, it further comprises a swipe detection sensor, which is able to cause said processor to activate said readout area for emission of said secured data signals at least one time by said at least one transducer coil, when said credit card is in the vicinity of a credit card reader. Accordingly, secured data signals are only emitted in the communication time period during which said credit card is in the vicinity of the credit card read head, which further enhances the security of said secured data. The secured data is activated immediately after the swipe detection sensor has registered the presence of such a read head, i.e. the swipe detection sensor enables the activation of said secured data by said processor.

In another embodiment of said credit card, said at least one strip of inducible core material is provided with one or more distributed air gaps. Thus, the strength of the magnetic field being provided by a credit card according to the invention is increased, which further aids the communication between said credit card and a credit card reader, and decreases the current required, resulting in a decreased power consumption of said credit card, when inducing secured data signals to said at least one transducer coil, which prolongs the life time of the power supply provided on said credit card.

In another embodiment of said credit card, said one or more air gaps are provided with distributions of material having different electromagnetical inducibility as compared to the material of said at least one strip. Thus, the magnetic field homogeneity is improved by the appropriate selection of air gap material, further improving said data communication.

In another embodiment of said credit card, said one or more windings are placed substantially at one end of said at least one strip of inducible core material. Destructive influences from the magnetic field of said windings in relation to a read head of a credit card reader are thus reduced considerably, while said transducer coils are still maintaining a strong and homogenous magnetic field when emitting said secured data signals.

In another embodiment of said credit card, said credit card further comprises activation indicator means for indicating the secured data activation status. One advantage of this embodiment being the card user is given the possibility to check, whether the fingerprint authentication means provided on the credit card according to the present invention have activated said secured data, before communication is attempted to be established between the credit card and a card reader device, e.g. drawn through an automatic payment device reader. Time is not thus not Wasted attempting to insert a non-activated credit card into an ATM or the like, resulting in communication failure.

In yet another embodiment of said credit card, said electrical power supply comprises at least one battery. Advantages comprise conventional flat batteries are economical in use, and simple to implement in a credit card according to the present invention.

Further, using batteries limits the useable life time period, which for some uses of such a credit card is an advantage in order to control the life time period of the card or the number of card uses.

In still a further embodiment of said credit card, said electrical power supply comprises at least one rechargeable battery. One advantage includes said credit card according to the present invention being useable for extended periods of time.

In yet another further embodiment of said credit card, said electrical power supply further comprises recharging means for said rechargeable battery. One advantage being a credit card according to said embodiment is entirely power self-sufficient and may be used for an extended lifetime period.

In still a further embodiment of said credit card, said recharging means for said rechargeable battery comprise a solar cell arrangement. One advantage being the solar cells may be provided on a surface of the credit card being subjected to light before and/or during the communication operation between the secured data and the external system.

In a further embodiment of said credit card, said card body further comprises power supply status indicator means. One advantage being the information of a failing power supply is available to the card user on the spot without the use of external means. Thus, the possibility of a power failure for the credit card according to the present invention to stop operating is kept to a minimum.

In a further embodiment of said credit card, said data carrier means include a first data storage for holding card owner fingerprint data, and a second data storage for holding secured data. In this way, said data is kept separated for added security and further said data storages may be conventional data storage means, keeping down production expense.

In further embodiments of said credit card, said second data storage is a magnetic strip or a smart card chip. An advantage of this being said second data storage are conventional data storage means, which keep down credit card production expenses and ease the credit card communication with existing external reading devices in an ATM or the like.

In a further embodiment of said credit card said fingerprint authentication means and said data carrier means are combined in a single integrated circuit, such as a microcontroller with a memory. Accordingly, the number of components needed for the operation of such a credit card is kept low, reducing the costs of said credit card.

In a further embodiment of said credit card said single integrated circuit is able to be put in a first state, in which said secured data and said card owner fingerprint data is temporarily available for an activation of said secured data. Accordingly, the security of said secured data is increased further, because outside said temporary period the data is not available for reading by any external reading or tapping devices, which a potential thief may have in his possession.

In a further embodiment of said credit card, said fingerprint reading means comprise a plurality of fingerprint reading systems. Hereby is provided a possibility of selecting a specific fingerprint reading system for activation of an associated set of secured data. Also, it is possible by selecting one or a combination of fingerprints for an activation of a credit card service provided on said card in the form of a specific secured data set.

In a further embodiment of said credit card, there is provided one fingerprint reading system for each credit card service available on said credit card. Accordingly, several credit card services are available for a card owner to activate in the form of several secured data sets, which by selection of an appropriate fingerprint or fingerprint combination activates a given set of secured data for readout in said readout area.

In another embodiment of said credit card, said card owner fingerprint data comprises at least one fingerprint or fingerprint combination corresponding to a deactivation fingerprint, and said processor is adapted for deactivation of the readout area during a predetermined deactivation period, when said deactivation fingerprint is pressed against said fingerprint reading means. Thus, if coerced by a criminal into using the biometric credit card for e.g. cash money transfers, a credit card owner is given the opportunity to render the credit card inoperable for a longer time period, e.g. hours, days, or months, even permanently in order to discourage would-be criminals from such coercion. Thus, the services provided by said secured data has been even more safeguarded from misuse by such criminals.

In yet another embodiment of said credit card the fingerprint reading means are able to pre-store card owner fingerprint on said data carrier means in a one-time operation. Accordingly, personal ID-data, namely the fingerprint data of the card owner, is only stored one time and only at one location, which further improves the security of said personal ID-data. This is due to the fact that there is no need for any other or further registration in a database or carrier external to the memory provided on a credit card according to the invention, and thus no possibility is provided for neither a central registration of such personal ID-data as fingerprint data nor a potential tapping of such a central registration.

It is further also an object of the invention to provide a secured data activation system for a data carrier, such as a credit card according to the invention, which improves the security of said secured data by improving the data communication between said data carrier and a data carrier reader.

In a second aspect of the invention, the above object are achieved by a secured data activation system for a data carrier, such as a credit card according to the invention, comprising a data carrier means holding at least secured data; an input device for acquiring an input; a readout area; secured data activation means comprising a data processor, which based on said input is able to submit said secured data to said readout area; and an electrical power supply delivering electrical power to at least said input data unit, said secured data activation means, and said readout area; said readout area comprising at least one driver circuit in communication with at least one transducer coil, which comprises one or more windings around at least one strip of electromagnetically inducible core material, each strip being individually inducible by said processor to emit a magnetic field containing secured data signals corresponding to said secured data.

Thus, a data carrier is provided which is able to submit secured data to a readout area for emission of secured data signals to a data carrier reader for an improved communication between these. Such a data carrier is suitable as a substitute for any data carrier having conventional magnetic strips, and may require a data input or active input before being activated. Applicable systems, other than credit cards systems, may be automatic employee attendance systems, individualized Internet shop cards, ID-badges etc. Said input is not limited to fingerprint authentication, but may also be retina, signature, or other authentication, or may even be a simple push button input, and said input may originate from any person, not only the person or entity to which said secured data relates to.

The credit card according to the present invention will now be described by way of example, with reference to the diagrammatic drawings, in which.

Figure 1:
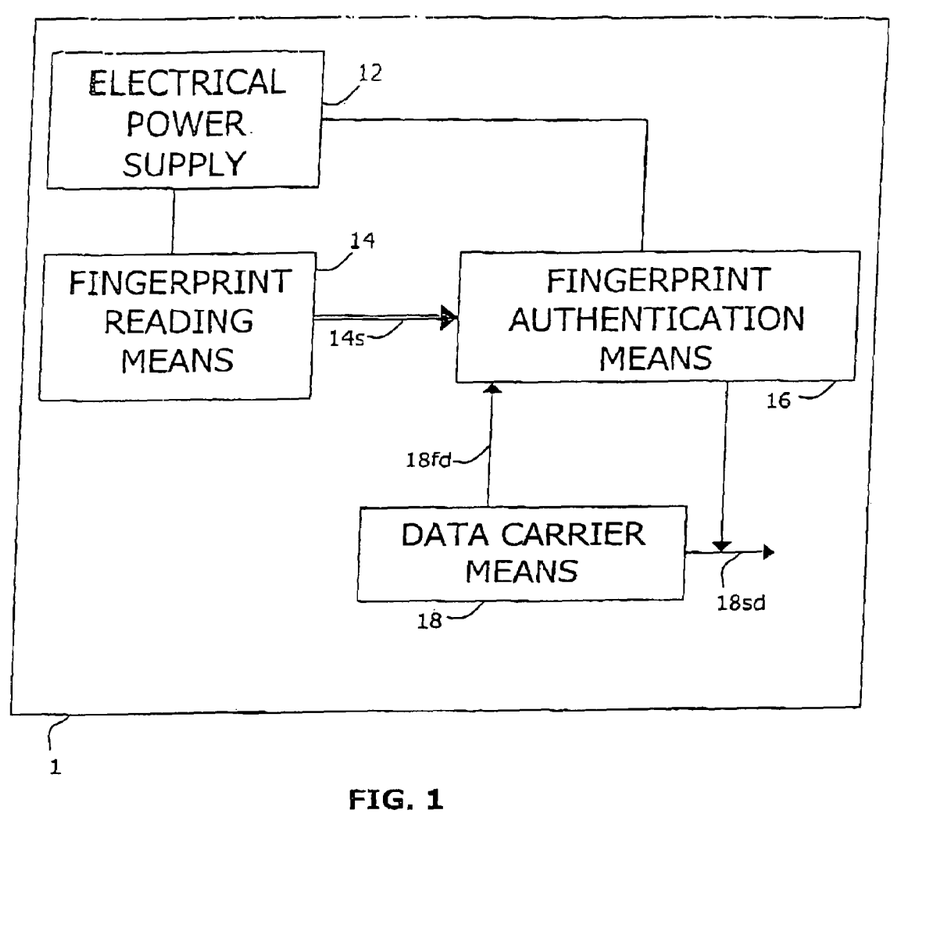
FIG. 1 is a block diagram over a credit card according to one embodiment of the present invention.

FIG. 1 shows a diagrammatic block diagram for a credit card according to the invention. Said credit card comprises a card body 1, an on-the-card electrical power supply 12, fingerprint reading means 14, fingerprint authentication means 16, and data carrier means 18.

Said electrical power supply 12 is delivering electrical current to at least the fingerprint reading means 14 and in the embodiment shown in FIG. 1 also to fingerprint authentication means 16 using any conventional electrical connection (solid line). Obviously, certain or all electrical components of said credit card may be provided with electrical power from said power supply 12. Said fingerprint reading means 14 provide fingerprint signals 14s to the fingerprint authentication means 16 in order to enable a comparison between said fingerprint signals 14a and card owner fingerprint data 18fd pre-stored in said data carrier means 18 for activating secured data 18sd likewise pre-stored in said data carrier means 18.

Said electrical power supply 12 may advantageously comprise one or more rechargeable and/or non-rechargeable batteries. The power supply 12 preferably further comprise electrical connections to the various means provided on the card body, and, in the case of rechargeable batteries being provided, preferably recharging means, e.g. terminals for connection to an externally provided battery charging system or, advantageously, solar cells provided on said card body, said recharging means in electrical communication with said rechargeable battery or batteries.

Present non-rechargeable batteries are compact, both in power and in size, and one or more batteries provide adequate power for several fingerprint readings and accompanying authentications for communication operations between a credit card according to the present invention and a card reader device. In some uses for such a credit card it may be preferred to limit the battery life time period in which such card may be active, e.g. limiting the use of a card to two authentications in a user test trial of such a novel card.

Fingerprint reading means 14 may comprise any available conventional device, preferably a small and flat fingerprint reading system provided on one or two sides of the card body 1, which system may comprise some or all of one or more biosensors, a fingerprint image taker, a fingerprint data storage, a fingerprint data analyzer, or the like. The fingerprint signals 14s provided to the fingerprint authentication means 16 may comprise signals encompassing several data, e.g. analyzed or raw fingerprint image data, heat sensor data, etc. Said fingerprint reading means 14 is thus able to provide fingerprint signals 14s based on one or more fingers being pressed against any biosensor provided on the card.

The data carrier means 18 comprise one or more storage devices, i.e. a first data storage comprising at least one or more memory units for storing card owner fingerprint data and a second data storage comprising one or more memory units for storing secured data. Said data storages may be one and the same unit storing all data, or two or more units storing each their type of data, or a combination of these.

Card owner fingerprint data 18fd is data concerning one or more fingers of an authorized card owner, said data preferably being pre-stored on the credit card according to the present invention. Said pre-storage may be performed in any conventional way, e.g. by a card owner fingerprint storing operation certified by the credit card provider. Memory units used for storing card owner fingerprint data may take the form of RAM, ROM, PROM's, EEPROMS, smart card chips, magnetic strips or the like.

An added security is provided by the fact that pre-storing and thus registration of card owner fingerprints may be performed only on a limited number of credit cards, preferably only one credit card. Thus it is possible to avoid having to register fingerprints outside the credit card in question, and thus the possibility of an unauthorized person stealing a set of fingerprints data to match a stolen card is virtually non-existing. Preferably, said pre-storage of the card owner fingerprints is performed on the card in a one-time only operation, where the fingerprint data is obtained by the fingerprint reading means 14 provided on said credit card. Thus, the original fingerprints of the card owner are only stored one place, i.e. on the credit card in the first data storage, and not in e.g. a central storage database. This adds to the security of said fingerprint data, as it removes the client concern of having their very personal fingerprints registered centrally. Further, this removes any possibility of illegally acquiring such centrally stored fingerprint data by a potential thief. The processor of said credit card may be set up as to be able to hinder any further pre-storage being performed or it may be set up for allowing only one registration of one or more card owner fingerprints or fingerprint combinations, either once for each lifetime of said credit card, or for each provision or deletion of each credit card service on said card, which is performed by adding or deleting one or more sets of secured data in said second storage.

The term "credit card owner" denotes one or more persons, all of which have their respective fingerprint data sets pre-stored in the data carrier means of one credit card according to the invention. This allows for more than one person is able to activate the secured data held by said one credit card. The term "credit card user" denotes the person, who is attempting to activate the secured data on a credit card according to the invention.

Secured data 18sd comprises one or more sets of secured data, each set of secured data containing e.g. personal data or bank teller information, such as card number, or the like, which data is used to gain access to personal services either cash, automatic payment of commodities, or the like. Memory units used for storing secured data on the conventional credit cards often take the form of smart card chips or magnetic strips, but according to the present invention the secured data may be stored on data carrier means, such as an EEPROM or FLASH-type memory as the first and/or second data storage. Thus, the credit card according to the invention creates an effective blocking of the availability of said secured data, especially for preventing any un-lawful copying of the magnetic information provided on a conventional magnetic strip, because the secured data is only released to the readout area in a form of electromagnetically induced secured data signals from said one or more transducer coils after a card user authentication procedure has been performed.

The fingerprint authentication means 16 comprise means for authenticating fingerprint signals 14s provided by the fingerprint reading means 14, where said authentication preferably comprise a comparison procedure using card owner data pre-stored in said data carrier means 18, and a secured data activation procedure for activating said secured data pre-stored in said data carrier means 18, but may include further or other authentication steps e.g. comprising user/card provider selection options.

Said fingerprint authentication means 16 comprises a processor capable of performing the authentication procedures. Said processor may be dedicated for said authentication or may also be incorporated in a smart card chip for said secured data.

Preferably, said fingerprint authentication means and data carrier means may be provided in combination as a single integrated circuit on said credit card, e.g. in the form of a microcontroller chip with an EEPROM or FLASH type memory. In order to further enhance the security of the data held in said memory, i.e. secured data and card owner fingerprint data, said single integrated circuit or even said one or more data storages may be unavailable for external reading, e.g. by short circuiting the appropriate pins of the integrated circuit, during the time period, in which said credit card is not in use. This inhibits any attempt by a potential thief, which has access to integrated circuit reading means, to read said data without a preceding fingerprint authentication. Said short circuiting of said single integrated circuit is then temporarily opened in order to make the data available for activation by the above mentioned fingerprint authentication process. This opening of the short circuiting may be initiated by performing an operation on the card, e.g. one or more fingers touching the fingerprint reading means, or by any other suited means.

Preferably, said fingerprint authenticated activation of the secured data may be maintained for a predetermined time period. Examples showing the applicability of this embodiment encompass activation of the secured data during the time period in which one or more fingers are pressed against the fingerprint reading means, e.g. during a swift passing of the credit card through a reading device in an automated payment device, or alternatively during the time period stretching itself from the moment in which the card owner has released the credit card into a ATM, and the moment, when the ATM has completed reading of the secured data provided on the credit card. A major advantage of said credit card according to the present invention is the fact that a complete and selfcontained automated authentication process is performed prior to communication being established between said credit card and any of the existing ATM's on the market today, irrespective of type (automated or manually operated), manufacturer, version, or geographical position of said ATM.

Preferably, said secured data is activated for a precisely set predetermined time period, allowing for just enough time for communication to be established and completed. If said time period is chosen too long, this may provide a card thief ample time to perform his/her own transaction, resulting in lower security for said secured data. If the time period is set too short, there may not be enough time to complete communication between the credit card and the ATM or the like. After said time period, the secured data is not submitted by the processor, and a new authentication is to be performed again, when needed. This procedure is preferably used, when the timing of the secured data activation start and end is not critical.

Alternatively, as will be described below, a swipe detection sensor is provided on the credit card, which activate the secured data in one or more data bursts, when the swipe detection sensor registers a swipe being made past a read head of a credit card reader.

Figure 2:
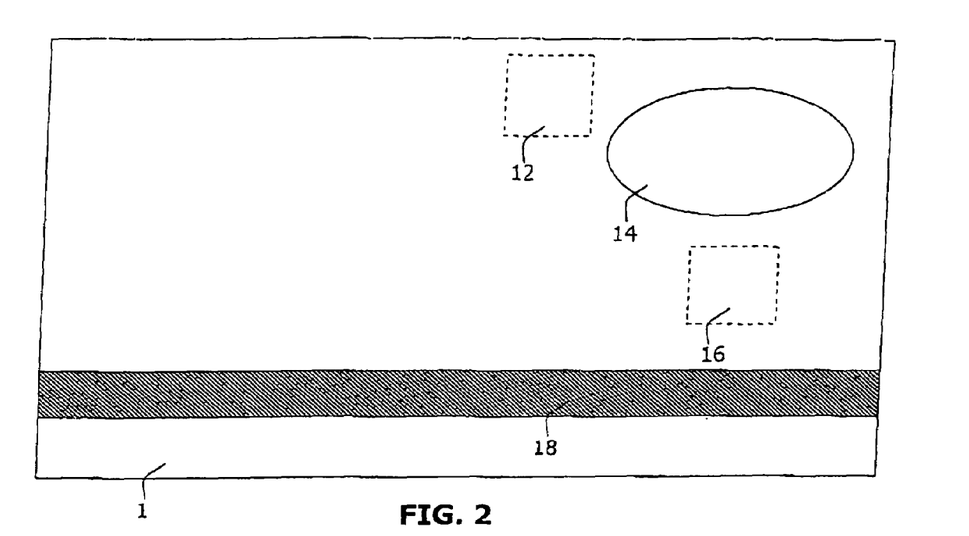
FIG. 2 shows a first credit card comprising a magnetic strip.

In FIG. 2 is shown one surface of a credit card according to another embodiment of the present invention comprising a card body 1 on one side provided with a magnetic strip as data carrier means 18, and provided with an electrical power supply 12 such as a rechargeable or non-rechargeable battery.

Figure 3:
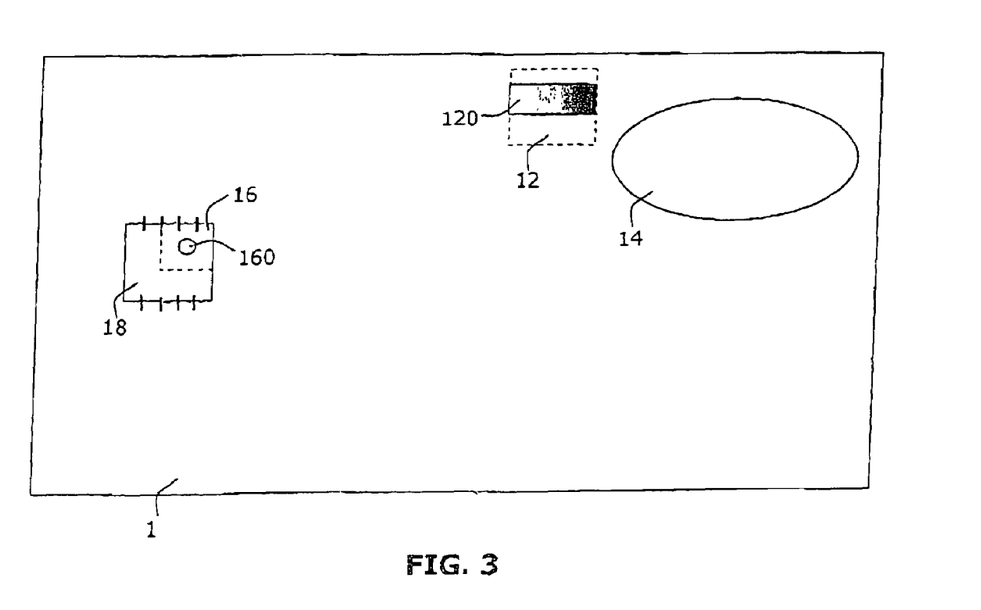
FIG. 3 shows a second credit card comprising a smart chip.

Advantageously, a credit card according to the present invention may also comprise activation indicator means for indicating the secured data activation status, i.e. whether or not the secured data provided on such a card is in a state of activation. In FIG. 3 is shown such an activation indicator means 160 in this embodiment comprising a green or green/red LED, where green light indicates activation of the secured data pre-stored on said data carrier means and no green or red light indicates no activation of said secured data. The advantage of such a means is the card user may assure him or her self of the state of activation before he or she utilises the credit card according to the present invention in a reading device in order to avoid futile attempts for the reading device to communicate with the data carrier means provided on the card, if no activation has been initiated due to fingerprint mismatch, low battery power or the like.

Said activation indication means 160 may advantageously for power consumption reasons be turned off when the card is not being used, i.e. only during a short time period after one or more fingers have been placed on the fingerprint reading means.

FIG. 3 further shows a credit card provided with power supply status indicator means 120, in this embodiment consisting of an electrically conductive colour changing strip, the changing of the colour indicating battery power status. This is especially of use, when rechargeable batteries are provided on the credit card to indicate for a card user when it is time to charge said batteries, but may also be used to indicate card wear status for a short life time use.

Figure 4:
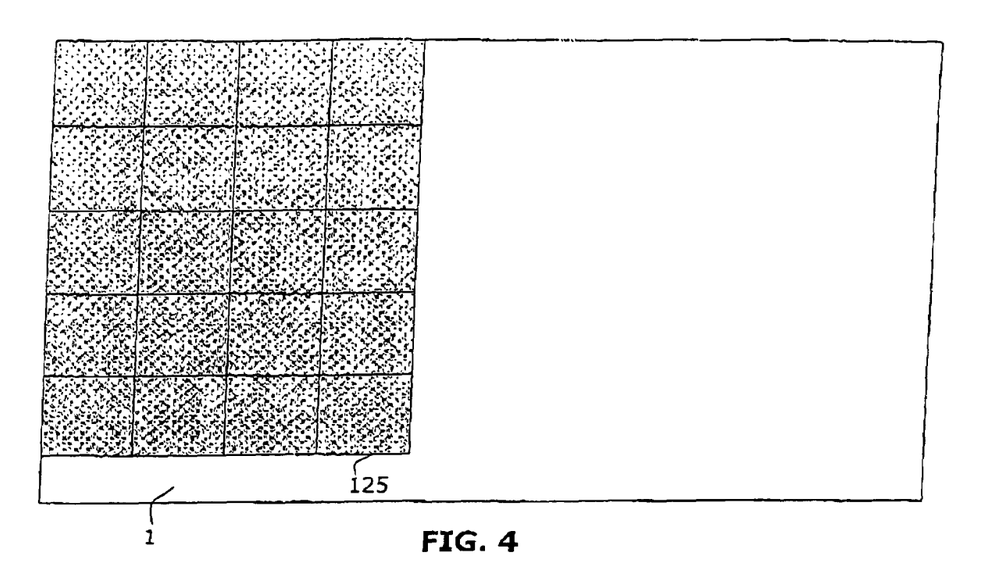
FIG. 4 shows the back side of a credit card according to one embodiment of the present invention.

FIG. 4 shows a further embodiment of the credit card according to the present invention, in which one side of the card body 1 partly is provided with solar cells 125 for recharging of rechargeable batteries being provided on said credit card. The exact type, arrangement, size, number and other characteristics of said solar cells may vary, but these preferably match the recharging need of said batteries for at least one authentication being performed by the card and for the optional associated indications to the card user. Said recharging means may of course assume other forms, e.g. recharging terminals being provided on said credit card for connection to externally provided charging means, such as corresponding charging terminals on a conventional battery charger.

Figure 5:
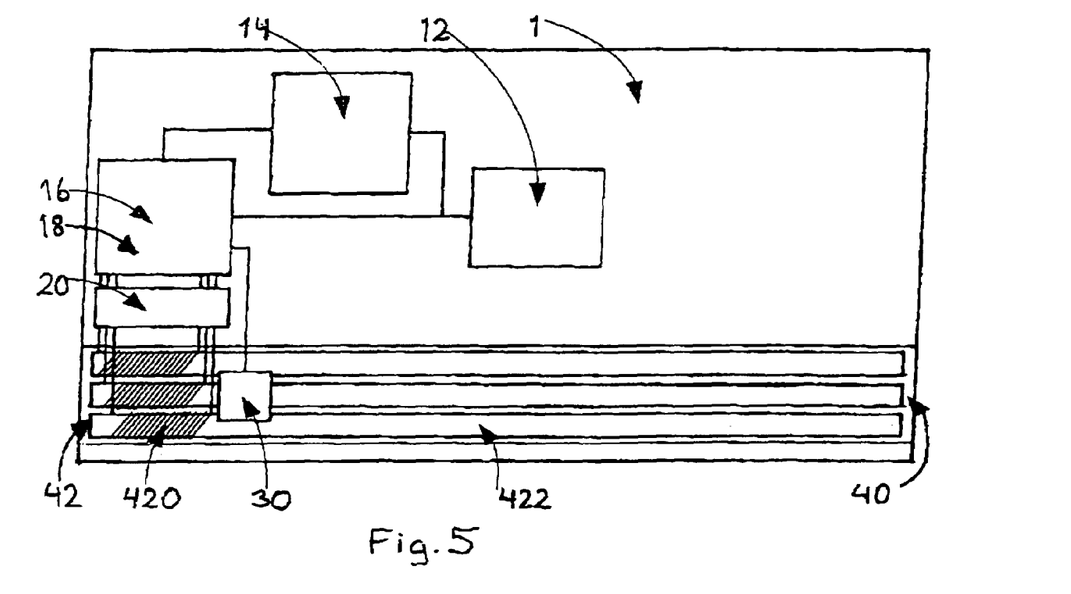
FIG. 5 shows a credit card according to a preferred embodiment of the present invention.

In FIG. 5, a credit card according to the invention is shown in a preferred embodiment, which comprises a card body 1, comprising a rechargeable battery 12 supplying electrical current to fingerprint reading means 14, fingerprint authentication means 16 comprising an EEPROM memory 18 and a processor, i.e. a microcontroller, and a readout area 40. The fingerprint authentication means 16 is able to compare fingerprint signals received from the fingerprint reading means 14 with card owner fingerprint data stored in said memory 18 in order to, during a predetermined time interval, submit signals corresponding to secured data also stored in said memory 18 through a driver circuit 20 also provided on said card body 1 onto a readout area 40 on said card body 1 for emission of said secured data signals. No secured data are emitted from said readout area 40 outside said predetermined time interval.

Figure 6:
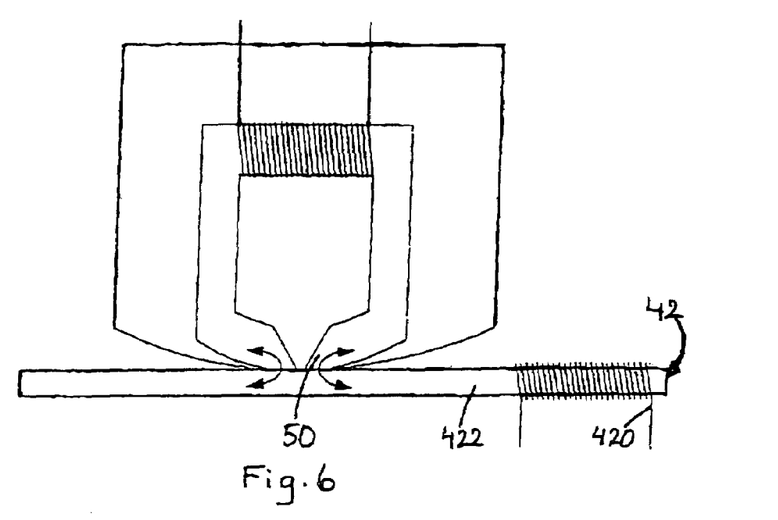
FIG. 6 shows a transducer coil of a credit card according to the preferred embodiment of the present invention in the vicinity of a credit card reader.

The readout area 40 comprises three transducer coils 42, of which one is shown in FIG. 6, each comprising a number of windings 420 wound around an end section of a strip 422 of electromagnetically inducible core material. Each transducer coil 42 is individually inducible by said driver circuit 20. The number of transducer coils is advantageously chosen to three in order to induce secured data signals corresponding to conventional magnetic strip information, which lies in magnetic strips in three tracks. For most applications, data is only to be generated in two transducer coils 42, corresponding to the first and second of said conventional magnetic strips. In conventional magnetic strips, the data is permanently magnetically presented to a credit card reader using a so-called F2F-format, or two frequency format, in which a "0" bit is formed by a magnet part of a predetermined length in said magnetic strip, and a "1" bit is two longitudinally, magnetically oppositely directed magnet parts, having a combined length equal to said length of the "0" bit magnet part. One conventional magnet track is usually provided with 1210 bits/inch. Thus, the transducer coils 42 of the credit card and secured data activation system according the present invention preferably is to emit and present said secured data signals in such F2F-format to a credit card reader, which is to read said credit card with a read head 50.

The transducer coil 42 shall produce a homogenous and relatively strong magnetic field in order for it to be readable by a credit card reader. The nature of this magnetic field is very influenced by the transducer coil construction, such as choice of core material and core construction of the cores strips 422, number of windings 420 and position of the windings 420 upon the core strips 422. Variations in the signals to a transducer coil 42 generates a variable magnetic field along the strip, which is identical to the magnetic field, which a read head is influenced by, when a conventional magnetic strip credit card holding the same secured data is passed through the same reader.

The material of the core strip 422 is advantageously an electromagnetically inducible material, such as metal, preferably electromagnetic lamination, sheet iron or other sheet metal, either provided as a single or double foil on one or each side of the card body, advantageously having a width and a position corresponding to a conventional magnetic track in order to have a similar magnetic and physical appearance. The choice of core material of the core strips strongly influences the strength and distribution of the magnetic field produced, and allow an enhancement of the magnetic field being produced, resulting in the need for lower current in the windings, which reduces the power consumption of said credit card.

The core strip 422 may preferably be provided with distributed air gaps (not shown), or contaminations of another less or more electromagnetically inducible material, such as plastic or paper, either provided along the extend of the core material or inside the card body in order for the transducer coil to produce several small magnetic fields along the core material to provide a homogenous magnetic field distribution for facilitating improved readability by a read gap of a credit card reader being used on the credit card according to the invention. Without such air gaps, the strongest part of the magnetic field has a tendency to flow from one end of the core strip to the other end thereof and accordingly away from a read gap of a magnetic read head of a credit card reader.

The term "core strip" is to be understood as indicating substantially elongated parts of core material, thus also comprising several successively positioned small or larger core material sections and/or one integral core material section, having a smaller or larger thickness of material layer and having suitably dimensioned widths and heights for producing a magnetic field of a desired strength, homogeneity and extent.

It has been found that providing the windings 420 of the transducer coil 42 on an end section of the electromagnetically inducible core strip 422 is able to provide a homogenous magnetic field being emitted by the entire readout area 40. Providing said windings 420 on one end section of said core strips 422 as seen if FIG. 5 and 6 also helps to reduce magnetic interferences between the windings 420 provided on said credit card and the read head 50 of a credit card reader. Thus, the provision of the windings 420 of the respective three transducer coils 42 may alternatively advantageously be provided consecutively in opposite end sections. Obviously, the windings of said transducer coil may also alternatively be provided evenly distributed along the core strip extension, or may be distributed in one or more sections of said core strip or sections thereof. The windings 420 are preferably provided around the short side of the core strip 422 and may be provided in any appropriate number relating to desired magnetic field strength, current load of the windings, magnetic appearance, etc. Obviously, the windings are of a material, which is able to induce a magnetic field into said inducible core strips, e.g. a metal like iron or another suitable conducting material.

By the invention it has been realized that such an "activatable magnetic strip" in the readout area may be useful for other applications, in which secured data from a magnetic strip requires an input before being activated, e.g. automatic employee attendance systems, individualized Internet shop cards, ID-badges etc. Said input is not limited to fingerprint authentication, but may also be retina, signature, or other authentication, or may even be a simple push button input, and may be from any person, not only the person or entity to which said secured data relates to. A secured data activation system is therefore also disclosed herein, shown as an example being such a credit card with fingerprint authentication.

In FIG. 5, the credit card shown also comprising a swipe detection sensor 30, which is provided by one of said transducer coils 42 for the detection of a credit card reader 50, when the credit card according to the invention is in the vicinity of such a reader, i.e. when said sensor 30 is adjacent to a pick-up read head 50 of a credit card reader. The swipe detection sensor 30 may comprise at least one winding (not shown) provided around one of said core strips 422. In use, the swiping of the credit card through a credit card reader will induce a current in said at least one winding, because said pick-up head 50 is magnetic and the card or head is moving, which thus activates the swipe detection sensor 30. Other swipe detection sensors, which may alternatively be used comprise: A) a switch, which is closed, when a read head of a credit card reader is in the vicinity of said sensor, or B) two conductors, which short circuit when the read head of a credit card reader is passed by in the vicinity of said sensor, or any other suitable swipe detection sensor means.

When card owner fingerprints are registered by said fingerprint reading means 14 the submittal of secured data to said transducer coils 42 may be enabled for a predetermined time period. During said time period, the secured data signals are only emitted from the readout area, when and if the swipe detection sensor 30 detects such a vicinity to a credit card read head 50, immediately after which preferably only one emission of the secured data signals is provided by said readout area 40. This is useful when swiping said credit card through a credit card reader with a relatively quick movement of said credit card. Alternatively, several emissions may be performed during said time period. This may be useful when said credit card is left inside said credit card reader for a longer lasting communication period.

In FIG. 6 is shown a conventional credit card reader head 50 reading one transducer coil 42 from a credit card according to the present invention (not shown). The credit card reader decodes the data being emitted by a credit card, upon which the coil is situated, preferably according to certain standards of presenting credit card data known to the skilled person, such as the ISO 7811 standard. In said standard, a protocol is used comprising a start sentinel, 76 alphanumeric characters comprising an initial format code and field separators between data parts, an end sentinel, and a longitudinal redundancy check character. The coils of the credit card may preferably generate secured data as described above in order to comply with such given standards.

In use, an owner of a credit card according to the present invention takes hold of said credit card, presses one or more fingers against the fingerprint reading means, and fingerprint authentication means provided on the credit card activate secured data provided on said credit card only if the fingerprint authentication performed on the card matches against card owner fingerprint data also provided on the credit card. If a fingerprint match is established, secured data pre-stored on the card is activated by the fingerprint authentication means and said secured data may be read from any reading device of an ATM or the like.

An advantageous function being provided by said credit card according to the invention is the provision of the storage in said data carrier means 18 of at least one fingerprint or fingerprint combination corresponding to deactivation fingerprints of said card owner. If a criminal is trying to coerce a card owner into activating the secured data in order to e.g. provide cash money for said criminal, such attempt may be neutralized or even avoided. This is due to the fact that the criminal is not aware of which fingerprint or fingerprints can activate or deactivate the secured data. Accordingly, the card owner is availed the opportunity to select an authentication finger or combination of fingers, which on said credit card are stored as deactivation fingerprints, and thus deactivate the secured data for a appropriately long deactivation time period, which may be selected to be hours, days, or longer, even permanently. The deactivation fingerprint is authenticated by the processor, which based on the positive authentication with a stored deactivation fingerprint renders said secured data inaccessible for a pre-selected deactivation time period, which may be stored in said data carrier means 18 or programmed into said fingerprint authentication means 16 or processor.

The processor or microcontroller is able to be programmed for a registration of which specific fingerprints from different fingers or combinations of fingerprints are to be used for long term credit card deactivation or for activation of the respective secured data sets for each credit card function available on one credit card according to the invention. Preferably, said processor or microcontroller is set up in such a way that such programming is only to be performed once, e.g. once for the life time of said credit card or once for each addition or removal of different credit card functionality, i.e. credit card service being provided by said credit card.

The authentication procedure being done on the card and independently of any reading device or other external apparatus is possible only because the power supply for this procedure is provided on the credit card itself. An independent, on-the-card, and substantially self contained power supply is provided with a credit card according to the present invention.

The exact configuration on the credit card of the different means provided on said card is not important and is only shown in the figures as way of example. One may prefer an integration of all means, ultimately into one fingerprint reading, authenticating, data carrying, power supplying device, such as an integrated circuit provided on said card, said integration being advantageous for cost reasons.

By the invention it is realised that by providing the credit card with a plurality of fingerprint reading systems enables a multi-function card A card owner may select one system amongst the plurality of fingerprint reading systems by pressing one or more fingers against said selected system. The selection thus activates an associated set of secured data, which optionally may be provided from the same provider, or different card providers. As an example, selection of a first fingerprint reading system may e.g. activate a first set of secured data concerning money access data; selection of a second fingerprint reading system may activate a second set of secured data concerning personal data. Accordingly, one advantage comprises as noted above optionally dispensing with a dedicated ID code number for each secured data set to be activated, which mitigates the need for a card user to remember several ID code numbers, one for each card in possession.

The invention claimed is:

1. A credit card having a card body, which comprises:
   a fingerprint reading element providing fingerprint signals representative of at least one fingerprint from a card user, when at least one finger of said user is pressed against said fingerprint reading element;
   a data carrier holding at least card owner fingerprint data and secured data;
   a readout area;
   a data processor configured to authenticate said fingerprint signals with said card owner fingerprint data; and
   an electrical power supply delivering electrical power to at least said fingerprint reading element, said data processor, and said readout area;
   at least one driver circuit in communication with at least one transducer coil in said readout area including at least one core winding around at least one strip of electromagnetically inducible core material, each strip being individually inducible by said data processor to emit a magnetic field containing secured data signals corresponding to said secured data; and
   at least one swipe detection sensor configured to detect when said credit card is in the vicinity of a credit card reader and to cause said data processor to activate said secured data by emission of said secured data signals at least once by said at least one transducer coil only when said swipe detector sensor has registered that the credit card is in the vicinity of a credit card reader, the swipe detection sensor including at least one sensor winding provided around one of said strips of electromagnetically inducible core material.

2. The credit card according to claim 1, wherein said data processor controls activation of said secured data based on authentication of the fingerprint signals by comparing these with said card owner fingerprint data such that, if the comparison is a match, then said secured data is activated, else said secured data is not activated.

3. The credit card according to claim 1, wherein activation of said secured data is maintained over a predetermined time period.

4. A The credit card according to claim 3, wherein said activation of secured data is performed by emission of secured data signals one or several consecutive times by said at least one transducer coil.

5. The credit card according to claim 1, wherein said at least one strip of inducible core material is provided with one or more distributed air gaps.

6. A The credit card according to claim 5, wherein said one or more air gaps are provided with distributions of material having different electromagnetical inducibility as compared to the material of said at least one strip.

7. The credit card according to claim 1, wherein said at least one core winding is placed substantially at one end of said at least one strip of inducible core material.

8. The credit card according to claim 1, further comprising an activation indicator for indication of the activation of said readout area.

9. The credit card according to claim 1, wherein said electrical power supply comprises at least one battery.

10. The credit card according to claim 1, wherein said electrical power supply comprises at least one rechargeable battery.

11. The credit card according to claim 1, wherein said electrical power supply further comprises a recharging element for said rechargeable battery.

12. The credit card according to claim 11, wherein the recharging element for said at least one rechargeable battery includes a solar cell arrangement.

13. The credit card according to claim 1, wherein said card body further comprises a power supply status indicator.

14. The credit card according to claim 1, wherein said data carrier includes a first data storage for holding card owner fingerprint data, and a second data storage for holding secured data.

15. The credit card according to claim 14, wherein said second data storage is a magnetic strip.

16. The credit card according to claim 14, wherein said second data storage is a smart card chip.

17. The credit card according to claim 1, wherein said data processor and said data carrier are combined in a single integrated circuit.

18. The credit card according to claim 17, wherein said single integrated circuit is able to be put in a first state, in which said secured data and said card owner fingerprint data is temporarily available for an activation of said secured data.

19. The credit card according to claim 1, wherein said fingerprint reading element includes a plurality of fingerprint reading systems.

20. The credit card according to claims 19, wherein there is provided one fingerprint reading system for each credit card service available on said credit card in the form of different secured data sets.

21. The credit card according to claim 1, wherein said fingerprint reading element is able to pre-store card owner fingerprint on said data carrier in a one-time operation.

22. The credit card according to claim 1, wherein said card owner fingerprint data comprises at least one fingerprint or fingerprint combination corresponding to a deactivation fingerprint, and wherein said data processor is adapted for deactivation of the readout area during a predetermined deactivation period, when said deactivation fingerprint is pressed against said fingerprint reading element.

* * * * *

UNITED STATES PATENT AND TRADEMARK OFFICE
CERTIFICATE OF CORRECTION

PATENT NO. : 7,681,232 B2
APPLICATION NO. : 11/001641
DATED : March 16, 2010
INVENTOR(S) : Nordentoft et al.

Page 1 of 1

It is certified that error appears in the above-identified patent and that said Letters Patent is hereby corrected as shown below:

On the title page, after item "(65) Prior Publication Data" insert item

--(30) Foreign Application Priority Data

March 8, 2004 (EP) 04075705.6

November 17, 2004 (EP) 04078148.6--

Signed and Sealed this
Twelfth Day of November, 2013

Teresa Stanek Rea
*Deputy Director of the United States Patent and Trademark Office*